United States Patent
Wallenberg et al.

(10) Patent No.: US 10,445,367 B2
(45) Date of Patent: Oct. 15, 2019

(54) SEARCH ENGINE FOR TEXTUAL CONTENT AND NON-TEXTUAL CONTENT

(71) Applicant: TELEFONAKTIEBOLAGET L M ERICSSON (PUBL), Stockholm (SE)

(72) Inventors: Mattias Wallenberg, Luleå (SE); Tommy Arngren, Södra Sunderbyn (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 887 days.

(21) Appl. No.: 14/891,259

(22) PCT Filed: May 14, 2013

(86) PCT No.: PCT/SE2013/050536
§ 371 (c)(1),
(2) Date: Nov. 13, 2015

(87) PCT Pub. No.: WO2014/185834
PCT Pub. Date: Nov. 20, 2014

(65) Prior Publication Data
US 2016/0085860 A1    Mar. 24, 2016

(51) Int. Cl.
*G06F 16/73* (2019.01)
*G06F 16/33* (2019.01)
*G06F 16/951* (2019.01)

(52) U.S. Cl.
CPC .......... *G06F 16/73* (2019.01); *G06F 16/334* (2019.01); *G06F 16/951* (2019.01)

(58) Field of Classification Search
CPC ......... G06F 17/30823; G06F 17/30675; G06F 16/73; G06F 16/334
See application file for complete search history.

(56) References Cited

U.S. PATENT DOCUMENTS

| | | | |
|---|---|---|---|
| 5,678,040 A | 10/1997 | Vasudevan et al. | |
| 5,832,495 A | 11/1998 | Gustman | |
| 5,963,940 A | 10/1999 | Liddy et al. | |
| 6,026,388 A | 2/2000 | Liddy et al. | |
| 6,363,380 B1 | 3/2002 | Dimitrova | |
| 6,366,296 B1 | 4/2002 | Boreczky et al. | |

(Continued)

FOREIGN PATENT DOCUMENTS

| | | |
|---|---|---|
| EP | 1 024 437 A2 | 8/2000 |
| EP | 1 220 541 A2 | 7/2002 |

(Continued)

OTHER PUBLICATIONS

Final Office Action for U.S. Appl. No. 13/559,258, dated Sep. 9, 2016, 39 pages.

(Continued)

*Primary Examiner* — Jensen Hu
(74) *Attorney, Agent, or Firm* — Rothwell, Figg, Ernst & Manbeck, p.c.

(57) ABSTRACT

A search engine system that can match a search request to not only a specific content item (e.g., video file), but also to a single component of a content item. For instance, using a video content item as an example, the search engine system can match a specific search request to not only a specific video within a collection of videos, but also to a single moment within a video, a video segment, and a group of videos.

21 Claims, 12 Drawing Sheets

(56) References Cited

U.S. PATENT DOCUMENTS

| | | | |
|---|---|---|---|
| 6,374,260 B1 | 4/2002 | Hoffert | |
| 6,484,156 B1 | 11/2002 | Gupta et al. | |
| 6,557,042 B1* | 4/2003 | He | G06Q 30/02 |
| | | | 709/231 |
| 6,643,643 B1 | 11/2003 | Lee et al. | |
| 7,131,059 B2 | 10/2006 | Obrador | |
| 7,149,359 B1 | 12/2006 | Omoigui | |
| 7,242,810 B2 | 7/2007 | Chang | |
| 7,382,933 B2 | 6/2008 | Dorai | |
| 7,493,312 B2 | 2/2009 | Liu et al. | |
| 7,627,556 B2 | 12/2009 | Liu et al. | |
| 7,676,495 B2 | 3/2010 | Qian | |
| 7,725,453 B1 | 5/2010 | Chen et al. | |
| 8,060,906 B2 | 11/2011 | Begeja et al. | |
| 8,065,301 B2 | 11/2011 | Ginsburg et al. | |
| 8,166,029 B2 | 4/2012 | Park et al. | |
| 8,438,157 B2 | 5/2013 | Adams, Jr. | |
| 8,442,994 B1 | 5/2013 | Chen et al. | |
| 8,566,370 B2 | 10/2013 | Jin et al. | |
| 8,611,422 B1 | 12/2013 | Yagnik | |
| 8,914,632 B1 | 12/2014 | Shankar et al. | |
| 9,292,552 B2 | 3/2016 | Arngren et al. | |
| 9,633,015 B2 | 4/2017 | Arngren | |
| 2001/0047379 A1 | 11/2001 | Jun et al. | |
| 2002/0054083 A1 | 5/2002 | Boreczky et al. | |
| 2002/0097983 A1 | 7/2002 | Wallace | |
| 2002/0161747 A1* | 10/2002 | Li | G06F 17/30017 |
| 2003/0033347 A1 | 2/2003 | Bolle | |
| 2003/0105589 A1 | 6/2003 | Liu et al. | |
| 2003/0107592 A1 | 6/2003 | Li et al. | |
| 2003/0108334 A1 | 6/2003 | Nevenka et al. | |
| 2004/0025180 A1 | 2/2004 | Begeja et al. | |
| 2004/0111432 A1 | 6/2004 | Adams, Jr. et al. | |
| 2004/0162870 A1 | 8/2004 | Matsuzaki et al. | |
| 2004/0215663 A1 | 10/2004 | Liu et al. | |
| 2004/0220925 A1 | 11/2004 | Liu et al. | |
| 2005/0102312 A1 | 5/2005 | Ohya | |
| 2005/0114357 A1* | 5/2005 | Chengalvarayan | |
| | | | G06F 17/30038 |
| 2005/0222981 A1 | 10/2005 | Lawrence et al. | |
| 2005/0265607 A1 | 12/2005 | Chang | |
| 2006/0093190 A1 | 5/2006 | Cheng et al. | |
| 2006/0122984 A1 | 6/2006 | Byers et al. | |
| 2006/0149624 A1 | 7/2006 | Baluja et al. | |
| 2006/0218191 A1 | 9/2006 | Gopalakrishnan | |
| 2006/0282336 A1 | 12/2006 | Huang | |
| 2007/0033515 A1 | 2/2007 | Sull et al. | |
| 2007/0055695 A1 | 3/2007 | Dorai et al. | |
| 2007/0056046 A1 | 3/2007 | Claudatos et al. | |
| 2007/0067304 A1 | 3/2007 | Ives | |
| 2007/0106646 A1 | 5/2007 | Stern et al. | |
| 2007/0106660 A1 | 5/2007 | Stern et al. | |
| 2007/0220025 A1 | 9/2007 | Hyman | |
| 2007/0250810 A1* | 10/2007 | Tittizer | G06F 8/73 |
| | | | 717/110 |
| 2008/0016101 A1 | 1/2008 | Ginsburg et al. | |
| 2008/0016293 A1 | 1/2008 | Saika | |
| 2008/0086688 A1 | 4/2008 | Chandratillake | |
| 2008/0109881 A1 | 5/2008 | Dasdan | |
| 2008/0112690 A1 | 5/2008 | Shahraray et al. | |
| 2008/0124055 A1 | 5/2008 | Shahraray et al. | |
| 2008/0232775 A1 | 9/2008 | Ljolje | |
| 2008/0310628 A1 | 12/2008 | Fujioka | |
| 2009/0006368 A1 | 1/2009 | Mei | |
| 2009/0019034 A1* | 1/2009 | Franks | G06F 17/30017 |
| 2009/0041356 A1 | 2/2009 | Barbieri et al. | |
| 2009/0110296 A1 | 4/2009 | Sekiguchi et al. | |
| 2009/0116645 A1 | 5/2009 | Jeong et al. | |
| 2009/0138472 A1 | 5/2009 | MacLean | |
| 2009/0154806 A1 | 6/2009 | Chang | |
| 2009/0210779 A1 | 8/2009 | Badoiu et al. | |
| 2009/0240674 A1 | 9/2009 | Wilde | |
| 2009/0299725 A1* | 12/2009 | Grigsby | G06F 17/30817 |
| | | | 704/2 |
| 2009/0300351 A1 | 12/2009 | Lei et al. | |
| 2010/0005121 A1 | 1/2010 | Benitez et al. | |
| 2010/0070485 A1 | 3/2010 | Parsons et al. | |
| 2010/0094630 A1 | 4/2010 | Yoakum | |
| 2010/0138292 A1 | 6/2010 | Park et al. | |
| 2010/0158470 A1 | 6/2010 | Tzoukermann et al. | |
| 2010/0161580 A1 | 6/2010 | Chipman et al. | |
| 2010/0211781 A1 | 8/2010 | Auradkar et al. | |
| 2011/0010372 A1 | 1/2011 | Sahasrabudhe et al. | |
| 2011/0040967 A1 | 2/2011 | Waller et al. | |
| 2011/0047163 A1 | 2/2011 | Chechik et al. | |
| 2011/0072012 A1 | 3/2011 | Ah-Pine | |
| 2011/0154405 A1 | 6/2011 | Isaias | |
| 2011/0208722 A1 | 8/2011 | Hannuksela | |
| 2011/0249956 A1 | 10/2011 | Komai | |
| 2011/0258188 A1* | 10/2011 | AbdAlmageed | |
| | | | G06F 17/30796 |
| | | | 707/736 |
| 2011/0299721 A1 | 12/2011 | He | |
| 2012/0023084 A1 | 1/2012 | Lalji et al. | |
| 2012/0089580 A1 | 4/2012 | Yamashita | |
| 2012/0110080 A1 | 5/2012 | Panyam et al. | |
| 2012/0124055 A1 | 5/2012 | Deubel et al. | |
| 2012/0158713 A1 | 6/2012 | Jin et al. | |
| 2013/0061035 A1 | 3/2013 | Hook et al. | |
| 2013/0151534 A1 | 6/2013 | Luks et al. | |
| 2013/0166587 A1 | 6/2013 | Berry | |
| 2013/0219024 A1 | 8/2013 | Flack | |
| 2013/0226930 A1 | 8/2013 | Arngren et al. | |
| 2013/0282687 A1 | 10/2013 | Ah-Pine et al. | |
| 2014/0032538 A1* | 1/2014 | Arngren | G06F 16/2228 |
| | | | 707/723 |
| 2014/0032562 A1 | 1/2014 | Arngren et al. | |
| 2014/0108020 A1 | 4/2014 | Sharma et al. | |
| 2014/0142958 A1 | 5/2014 | Sharma et al. | |
| 2014/0222755 A1* | 8/2014 | Soderberg | G06F 17/30265 |
| | | | 707/609 |
| 2014/0229488 A1 | 8/2014 | Arngren | |
| 2015/0234824 A1 | 8/2015 | Arngren | |
| 2015/0312259 A1 | 10/2015 | Alpha et al. | |
| 2016/0210443 A1 | 7/2016 | Arngren | |
| 2016/0217171 A1 | 7/2016 | Arngren | |
| 2017/0076151 A1* | 3/2017 | Roy | G06F 16/168 |

FOREIGN PATENT DOCUMENTS

| | | |
|---|---|---|
| EP | 1 480 100 A1 | 11/2004 |
| EP | 2216731 A2 | 8/2010 |
| EP | 2 323 046 A1 | 5/2011 |
| EP | 2 444 921 A2 | 10/2011 |
| EP | 2 657 884 A2 | 10/2013 |
| WO | 2001/017163 A1 | 3/2001 |
| WO | 02/084980 A1 | 10/2002 |
| WO | 2010/150226 A2 | 12/2010 |
| WO | 2011/104428 A1 | 9/2011 |
| WO | 2012/001216 A1 | 1/2012 |
| WO | 2014/185834 A1 | 11/2014 |
| WO | 2015/030645 A1 | 3/2015 |
| WO | 2015/030646 A1 | 3/2015 |

OTHER PUBLICATIONS

Garcia, E., "The Term Count Model: Demystifying Term Vector Calculations," Oct. 27, 2006, 7 pages, http://web.archive.org/web/20121029050356/http://www.miislita.com/term-vector/term-vector-2.html.

National Phase of PCT/SE2014/050027, U.S. Appl. No. 14/915,408, filed Feb. 29, 2016, 57 pages.

International Search Report and Written Opinion of the ISA issued for International Patent Application No. PCT/SE2014/050027 dated Nov. 3, 2014, 10 pages.

Lew, M.S., et al. "Content-Based Multimedia Information Retrieval: State of the Art and Challenges", ACM Transactions on Multimedia Computing, Communications and Applications, vol. 2, No. 1, Feb. 2006, pp. 1-19.

"MPEG-7 Overview", International Organisation for Standardisation, ISO/IEC JTC1/SC29/WG11, Coding of Moving Pictures and Audio, Oct. 2004, pp. 1-95.

(56) References Cited

OTHER PUBLICATIONS

Non-Final Office Action for U.S. Appl. No. 13/688,566, dated Sep. 10, 2014, 10 pages.
Non-Final Office Action for U.S. Appl. No. 13/688,566, dated Mar. 12, 2015, 11 pages.
Final Office Action for U.S. Appl. No. 13/688,566, dated Sep. 10, 2015, 16 pages.
Examiner-Initiated Interview Summary for U.S. Appl. No. 13/688,566 dated Nov. 16, 2015, 1 page.
Notice of Allowance for U.S. Appl. No. 13/688,566, dated Dec. 30, 2015, 19 pages.
Non-Final Office Action for U.S. Appl. No. 13/408,448 dated Feb. 6, 2013, 15 pages.
Non-Final Office Action for U.S. Appl. No. 13/408,448 dated Jun. 14, 2013, 19 pages.
Final Office Action for U.S. Appl. No. 13/408,448 dated Dec. 5, 2013, 21 pages.
Non-Final Office Action for U.S. Appl. No. 13/408,448 dated Apr. 7, 2014, 21 pages.
Final Office Action for U.S. Appl. No. 13/408,448 dated Aug. 29, 2014, 28 pages.
Advisory Action for U.S. Appl. No. 13/408,448 dated Nov. 7, 2014, 3 pages.
Weisstein, Eric W. "Probability Axioms." From MathWorld—A Wolfram Web Resource. http://mathworld.wolfram.com/ProbabilityAxioms.html, 1 page.
Examiner's Answer to Appeal Brief for U.S. Appl. No. 13/408,448 dated May 18, 2015, 10 pages.
Non-Final Office Action for U.S. Appl. No. 13/559,258, dated Aug. 15, 2013, 15 pages.
Final Office Action for U.S. Appl. No. 13/559,258, dated Feb. 4, 2014, 20 pages.
Advisory Action for U.S. Appl. No. 13/559,258, dated Apr. 21, 2014, 3 pages.
Non-Final Office Action for U.S. Appl. No. 13/559,258, dated Dec. 31, 2014, 17 pages.
Final Office Action for U.S. Appl. No. 13/559,258, dated Jun. 19, 2015, 23 pages.
Advisory Action for U.S. Appl. No. 13/559,258, dated Aug. 27, 2015, 3 pages.
Non-Final Office Action for U.S. Appl. No. 13/559,258, dated Jan. 20, 2016, 23 pages.
National Phase of PCT/SE2014/050240, U.S. Appl. No. 14/914,849, filed Feb. 26, 2016, 38 pages.
International Search Report and Written Opinion of the ISA issued for International Patent Application No. PCT/SE2014/050240, dated Dec. 8, 2014, 14 pages.
Cisco Systems, Inc., "Cisco Visual Networking Index: Forecast and Methodology, 2012-2017," Cisco White Paper, May 29, 2013, 15 pages.
Cisco Systems, Inc., "Press Release: Cisco Global Cloud Index Forecasts Cloud Traffic to Grow Sixfold by 2016," retrieved Jul. 8, 2014, dated Oct. 23, 2012, 5 pages.
Cisco Systems, Inc., Cisco Visual Networking Index: Global Mobile Data Traffic Forecast Update, 2012-2017, Cisco White Paper, Feb. 6, 2013, 34 pages.
www.google.com print screen of "Obama" search results, Aug. 16, 2013, 3 pages.
Lawto, J. et al., "A Scalable Video Search Engine Based on Audio Content Indexing and Topic Segmentation," Turin, Italy, Sep. 2011, 6 pages.
Yang, W. et al., "Discriminative Tag Learning on YouTube Videos with Latent Sub-tags," in proceeding of The 24th IEEE Conference on Computer Vision and Pattern Recognition, CVPR 2011, Colorado Springs, CO, USA, Jun. 20-25, 2011, pp. 3217-3224.
International Search Report and Written Opinion, PCT/SE2013/050536, completed Apr. 9, 2014, 17 pages.
Extended European Search Report for European Patent Application No. 14839431.5, dated Jul. 22, 2016, 9 pages.
Non-Final Office Action issued in U.S. Appl. No. 14/914,849 dated Dec. 28, 2017, 27 pages.
Excerpt of Prosecution History of U.S. Appl. No. 13/559,258 Sep. 9, 2016-Dec. 2, 2016 45 pages.
Excerpt of Prosecution History of U.S. Appl. No. 13/408,448 Nov. 1, 2016-May 9, 2014 45 pages.
Supplementary European Search Report for European Patent Application No. 14893538 dated Mar. 6, 2017, 3 pages.
International Search Report and Written Opinion issued in International Application No. PCT/SE2014/050655, dated Mar. 2, 2015, 15 pages.
Saracoglu, Ahmet et. al., "Content Based Copy Detection with Coarse, Audio-Visual Fingerprints", 2009 Seventh International Workshop on Content-Based Multimedia Indexing, 2009, IEEE, 6 pages.
Youtube and Shazam homepages retrieved on May 26, 2014, 2 pages.
$9^{th}$ International Workshop on Content-Based Multimedia Indexing (CBMI 2011), homepage, 2 pages, http://www-vpu.eps.uam.es/cbmi2011/.
Excerpt of Prosecution History of U.S. Appl. No. 13/764,219, Aug. 2014-May 2016 , 156 pages.
Excerpt of Prosecution History of U.S. Appl. No. 14/184,207, Jun. 2016-May 2017, 124 pages.
Non-Final Office Action issued in U.S. Appl. No. 14/915,408 dated Jul. 27, 2018, 38 pages.
Non-Final Office Action issued in U.S. Appl. No. 14/914,849 dated Jul. 27, 2018, 30 pages.
Non-Final Office Action issued in U.S. Appl. No. 15/312,848 dated Nov. 20, 2018, 32 pages.
Final Office Action issued in U.S. Appl. No. 15/312,848 dated Apr. 2, 2019, 25 pages.

\* cited by examiner

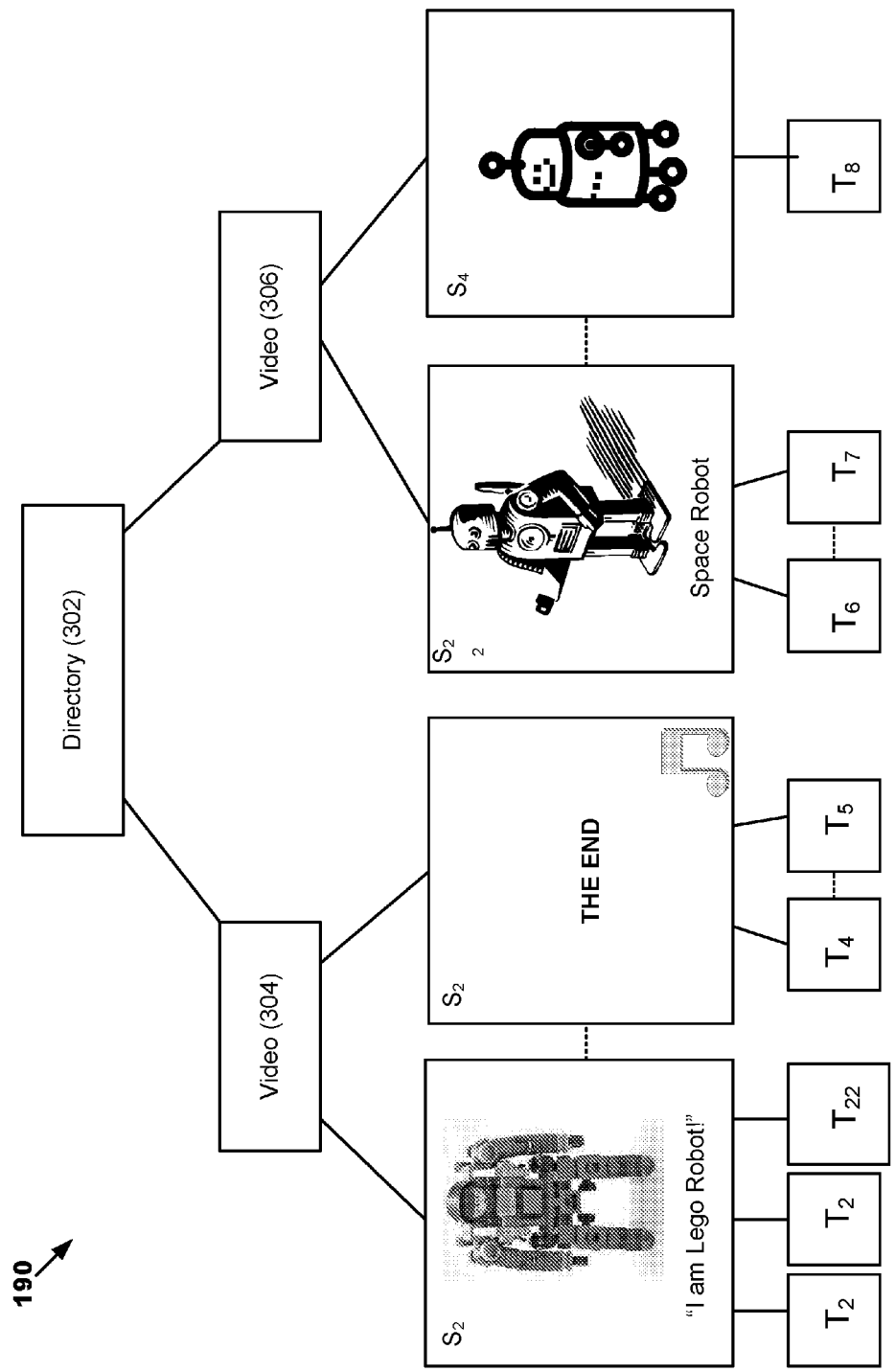

800

| Video | Segment | TAG |
|---|---|---|
| $V_1$ | $S_1$ | $T_1, T_2 ... T_N$ |
| | $S_2$ | $T_1, T_2 ... T_N$ |
| | $S_3$ | $T_1, T_2 ... T_N$ |
| | $S_4$ | $T_1, T_2 ... T_N$ |
| $V_2$ | $S_1$ | $T_1, T_2 ... T_N$ |
| | $S_2$ | $T_1, T_2 ... T_N$ |
| ⋮ | ⋮ | ⋮ |
| $V_N$ | $S_N$ | $T_1, T_2 ... T_N$ |

SEARCH ENGINE FOR TEXTUAL CONTENT AND NON-TEXTUAL CONTENT

CROSS REFERENCE TO RELATED APPLICATION(S)

This application is a 35 U.S.C. § 371 National Phase Entry Application from PCT/SE2013/050536, filed May 14, 2013 designating the United States, the disclosure of which is incorporated by reference.

TECHNICAL FIELD

This disclosure relates generally to search engine systems and apparatus, methods, computer programs and computer program products therefore.

BACKGROUND

Search engine systems (also referred to simply as "search engines") are systems that assist a user in finding information that the user wishes to obtain. Today, many of the most common search engines are Internet based and operate in a client-server environment that includes a client system (e.g., a web page displayed by a computer) that enables a user to submit to a search engine a search request. The search request typically includes one or more query terms, and each query term typically includes a word or a phrase. The search engine, in response to receiving a search request, typically compares the query terms (a.k.a. "keywords") against an index created from a multitude of content items, such as text files (e.g., ascii files), image files (e.g., .jpg files, .gif files), video files (e.g., .mpg files, .swf files, .avi files), web pages, and other content items, and, based on the comparison, returns an indication of the most relevant content items. The classic example of a search engine is an Internet search engine that uses user-provided keywords to find relevant web pages and returns a list of hyperlinks to the most relevant web pages.

For instance, a user may submit a search request to a search engine located at www.google.com (as retrieved on 2 May 2013). In response, the search engine will present a number of results, such as a list of web pages that match the query terms included in the search request, with the most relevant results often being displayed at the top of the returned web page. Similarly, a user may submit a search request to a search engine located at www.youtube.com (as retrieved on 2 May 2013) and receive a list of matching videos.

As the amount of digital data increases, search engine systems are being deployed not only for Internet search, but also for proprietary, personal, or special-purpose databases, such as personal archives, user generated content sites, proprietary data stores, workplace databases, and others. For example, personal computers may host a search engine to find content items stored anywhere on the hard-drive of the computer or in special-purpose archives (e.g., personal music or video collection) stored on the hard-drive.

Given this tremendous growth in the amount of digital data that is accessible to a user, particularly "non-textual" digital data, which we define as digital data that includes non-text data, such as, for example, video data, audio data, image data, etc., there remains a need to improve upon the existing search engine systems.

SUMMARY

The inventors have discovered that an improved search engine system is a system that can match a search request to

2 not only a specific content item (e.g., video file), but also to a single component of a content item. For instance, using a video content item as an example, the inventors have discovered that it would be advantageous to implement a search engine system so that it can match a specific search request to not only a specific video within a collection of videos, but also to a single moment within a video (e.g., a video frame), a time span within a video (e.g., a video segment) and a group of videos in the video collection. Described herein are implementations of such a search engine system.

For example, in one aspect of this disclosure, there is provided a method performed by a search engine system (SES). In one embodiment, the method includes receiving, at the SES, a search request transmitted by a client device. The search request includes one or more query terms. The method also includes the SES determining i) a query vector based on the one or more query terms, ii) a first segment vector for a first segment of a first non-textual content item, and iii) a second segment vector for a second segment of the first non-textual content item. The method also includes the SES calculating i) a first segment search score based on the result of a comparison of the first segment vector to the query vector, and ii) a second segment search score based on a result of a comparison of the second segment vector to the query vector.

In one embodiment, the first segment is associated with a first set of tags, the second segment is associated with a second set of tags, the first set of tags includes the first tag, the second set of tags includes the second tag. In such an embodiment, the method also includes determining a first set of tag vectors based on the first set of tags and the one or more query terms; and determining a second set of tag vectors based on the second set of tags and the one or more query terms. In this embodiment, the step of determining the first segment vector comprises summing the first set of tag vectors, and the step of determining the second segment vector comprises summing the second set of tag vectors.

In one embodiment, the method also includes the steps of: determining, by the SES, a first item vector for the first non-textual content item; determining, by the SES, a second item vector for a second non-textual content item; determining, by the SES, a first item search score, wherein the first item search score is based on a comparison of the first item vector to the query vector; determining, by the SES, a second item search score, wherein the second item search score is based on a comparison of the second item vector to the query vector; and selecting one or more of: the first segment, the second segment, the first non-textual content item, and the second non-textual content item based on the first segment search score, second segment search score, first item search score, and second item search score.

In one embodiment, the method also includes the step of transmitting an ordered set of two or more search results based on the search request, wherein the ordered set of search results includes a first search result that comprises information identifying the first segment, wherein the position of the first search result within the ordered set of search results is determined based on the first segment search score and a search score associated with each other search result included in the ordered set of search results.

In another embodiment, the method performed by the SES includes determining, by the SES, a first tag vector based on the one or more query terms and a first tag, wherein the first tag is linked with a first feature located in a first segment of anon-textual content item; determining, by the SES, a second tag vector based on the one or more query terms and a second tag, wherein the second tag is linked with a second feature located in a second segment of the non-textual content item; calculating, by the SES, a first tag search score based on the result of a comparison of the first tag vector to the query vector; and calculating, by the SES, a second tag search score based on the result of a comparison of the second tag vector to the query vector.

In one embodiment, the first set of tag vectors comprises a first weighted tag vector, and determining the first set of tag vectors comprises determining a first initial tag vector for the first tag and multiplying the first initial tag vector with a feature score associated with a feature type of the first tag, thereby producing the first weighted tag vector. The feature type may be one of image, audio, video, and text.

The search request may include a search type indicator. The search type indicator may indicate that the user is requesting a tag search.

In another aspect, search engine system (SES) is provided. In one embodiment, the SES comprises a data storage system. The SES also includes a data processing system. The data storage system includes instructions executable by the data processing system whereby the SES is operative to: determine a query vector based on query terms included in a search request; determine a first segment vector for a first segment of a first non-textual content item; determine a second segment vector for a second segment of the first non-textual content item; calculate a first segment search score based on the result of a comparison of the first segment vector to the query vector; and calculate a second segment search score based on a result of a comparison of the second segment vector to the query vector.

In one embodiments, the SES is operative to: calculate the first segment search score by, at least, calculating: (VQ·VS1)/(∥VQ∥ ∥VS1∥), where VQ is the query vector, and VS1 is the first segment vector, and calculate the second segment search score by, at least, calculating: (VQ·VS2)/(∥VQ∥ ∥VS2∥), where VS2 is the second segment vector.

In one embodiments, the SES is also operative to: determine a first item vector for the first non-textual content item; determine a second item vector for a second non-textual content item; determine a first item search score, wherein the first item search score is based on a comparison of the first item vector to the query vector; and determine a second item search score, wherein the second item search score is based on a comparison of the second item vector to the query vector. The SES may further be operative to select one or more of: the first segment, the second segment, the first non-textual content item, and the second non-textual content item based on the first segment search score, second segment search score, first item search score, and second item search score.

In another embodiment, the SES is operative to: determine a query vector based on query terms included in a search request; determine a first tag vector based on the one or more query terms and a first tag, wherein the first tag is linked with a first feature located in a first segment of a non-textual content item; determine a second tag vector based on the one or more query terms and a second tag, wherein the second tag is linked with a second feature located in a second segment of the non-textual content item; calculate a first tag search score based on the result of a comparison of the first tag vector to the query vector; and calculate a second tag search score based on the result of a comparison of the second tag vector to the query vector.

In another aspect, there is provided a search engine apparatus. In one embodiment, the search engine apparatus comprises a receiver unit configured to receive a search request transmitted by a client device. The search request includes one or more query terms. The search engine apparatus also includes a vector determining unit. The vector determining unit is configured to: determine a query vector based on the one or more query terms; determine a first segment vector for a first segment of a first non-textual content item; and determine a second segment vector for a second segment of the first non-textual content item. The search engine apparatus also includes a search score calculating unit. The search score calculating unit is configured to: calculate a first segment search score based on the result of a comparison of the first segment vector to the query vector; and calculate a second segment search score based on a result of a comparison of the second segment vector to the query vector.

In another embodiment, the vector determining unit is configured to: determine a query vector based on the one or more query terms; determine a first tag vector based on the one or more query terms and a first tag, wherein the first tag is linked with a first feature located in the first segment of the non-textual content item; and determine a second tag vector based on the one or more query terms and a second tag, wherein the second tag is linked with a second feature located in the second segment of the non-textual content item. In this embodiment, the search score calculating unit is configured to: calculate a first tag search score based on the result of a comparison of the first tag vector to the query vector; and calculate a second tag search score based on the result of a comparison of the second tag vector to the query vector.

In another aspect, a computer program product is provided. The computer program product includes a non-transitory computer readable medium storing computer instructions for searching content.

In one embodiments, the computer instructions include: instructions for determining a query vector based on query terms included in a search request; instructions for determining a first segment vector for a first segment of a first non-textual content item; instructions for determining a second segment vector for a second segment of the first non-textual content item; instructions for calculating a first segment search score based on the result of a comparison of the first segment vector to the query vector; and instructions for calculating a second segment search score based on a result of a comparison of the second segment vector to the query vector.

In another embodiment, the computer instructions include: instructions for determining a query vector based on query terms included in a search request; instructions for determining a first tag vector based on the one or more query terms and a first tag, wherein the first tag is linked with a first feature located in the first segment of the non-textual content item; instructions for determining a second tag vector based on the one or more query terms and a second tag, wherein the second tag is linked with a second feature located in the second segment of the non-textual content item; instructions for calculating a first tag search score based on the result of a comparison of the first tag vector to the query vector; and instructions for calculating a second tag search score based on the result of a comparison of the second tag vector to the query vector.

In another aspect, a computer program is provided. The computer program includes computer readable instructions.

In one embodiment, the computer readable instructions are configured such that when run on a search engine system, the instructions cause the search engine system to: determine a query vector based on query terms included in a received search request; determine a first segment vector for a first segment of a first non-textual content item; determine a second segment vector for a second segment of the first non-textual content item; calculate a first segment search score based on the result of a comparison of the first segment vector to the query vector; and calculate a second segment search score based on a result of a comparison of the second segment vector to the query vector.

In another embodiments, the computer readable instructions are configured such that when run on a search engine system, the instructions cause the search engine system to: determine a query vector based on query terms included in a received search request; determine a first tag vector based on the one or more query terms and a first tag, wherein the first tag is linked with a first feature located in the first segment of the non-textual content item; determine a second tag vector based on the one or more query terms and a second tag, wherein the second tag is linked with a second feature located in the second segment of the non-textual content item; calculate a first tag search score based on the result of a comparison of the first tag vector to the query vector; and calculate a second tag search score based on the result of a comparison of the second tag vector to the query vector.

The above and other aspects and embodiments are further described herein.

BRIEF DESCRIPTION OF THE DRAWINGS

The accompanying drawings, which are incorporated herein and form part of the specification, illustrate various embodiments.

FIG. 3 illustrates a hierarchical relationship between videos, video segments, and tags.

FIG. 8 is an illustration of a relational database in accordance with exemplary embodiments.

DETAILED DESCRIPTION

Existing search engine techniques do not provide functionality to match a specific search request with a single moment within a video, a time span within a video, and/or a collection of videos. For example, as is the case with the YouTube™ website, a user who submits a search request is not presented with a moment or segment from a video as a search result. The disclosed system, method, apparatus, computer program, and computer program product overcome these, and other, deficiencies of existing search engines.

When searching for non-textual content items (i.e., content items that include non-text data, such as, for example, video files), there are numerous types of results that may be of interest to the user. For example, a video stored in a video file can be considered, conceptually, as a series of very short moments, which together make up the video as a whole. As such, an optimal search result for a user's query can be one or more of: a specific moment in a video (e.g., a video frame), a segment of a video, and a tag associated with certain features of the video (e.g., images included in the video data, or sounds, text, and meta-data found in the video file that contains the video data). As such, embodiments of the present disclosure are directed to search techniques that enable a user to search for specific tags, moments, and segments within a video, as well entire videos or collections of videos.

Figure 1:
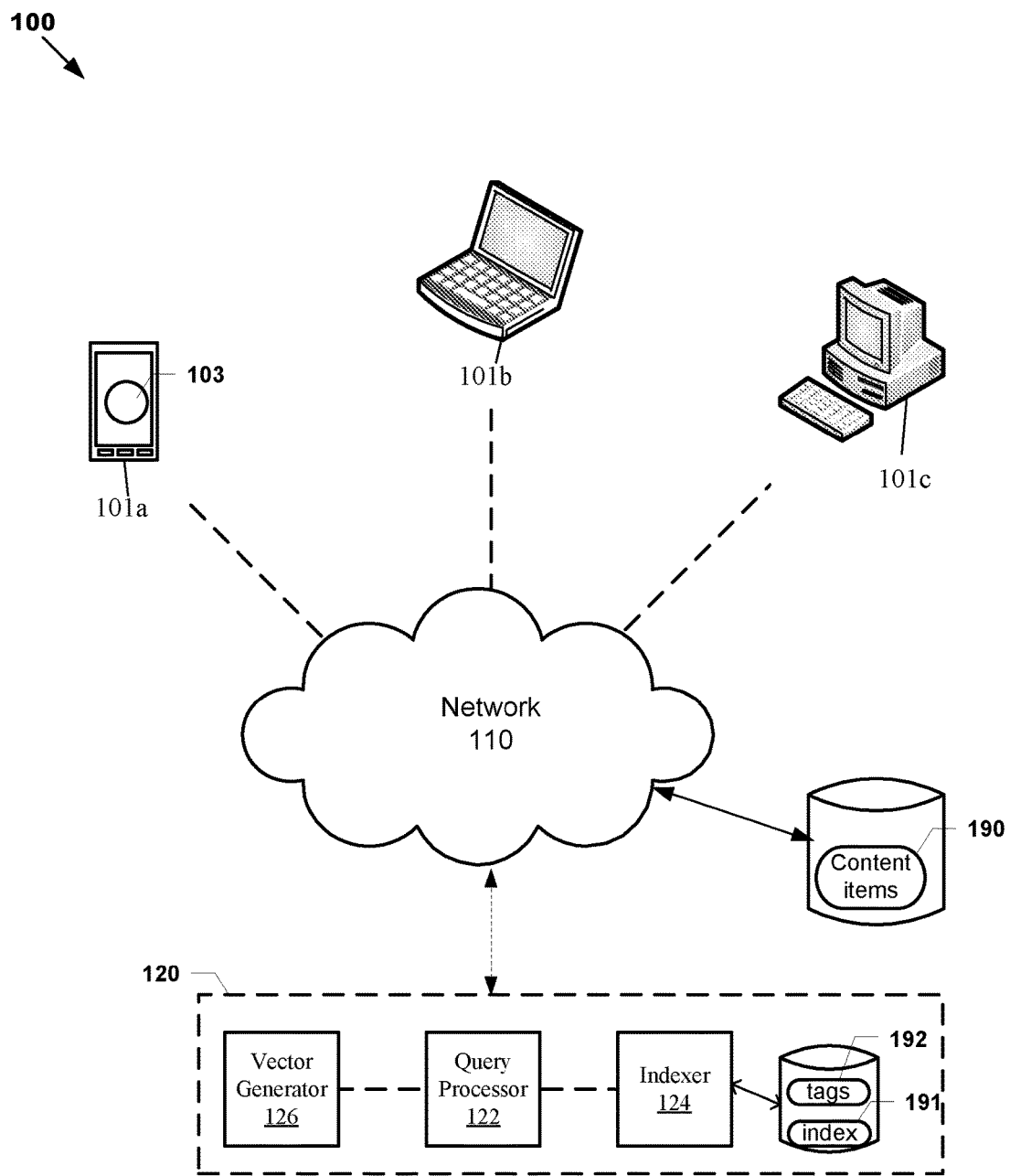
FIG. 1 is an illustration of a search engine system in accordance one embodiment.
Figure 2A:
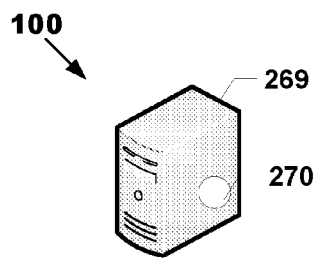
FIG. 2 illustrates a search engine server system according to one embodiment.

FIG. 1 illustrates a system 100 according to an embodiment. According to the illustrated embodiment, system 100 is a distributed, client-server system that includes a group of client devices 101a-c (e.g., smartphone, laptop computer, tablet device, desktop computer), each of which may execute a client computer program 103 (e.g. a web browser or app), connected to a search engine system (SES) 120 via a network 110, which may be a public network (e.g., the Internet), a private network, or some combination of the two. Network 110 may correspond to any type or combination of communication networks, including local-area networks, wide-area networks, wireless networks, cellular networks, etc. Without loss of generality, network 110 may be described herein as the Internet, but there are embodiments where network 110 is, for example, a local area network (LAN), such as a LAN used by a family in the family's home or a corporate network used by a company. While system 100 is illustrated in FIG. 1 as being a distributed, client-server system, in other embodiments system 100 need not be distributed. For example, in one embodiment, system 100 consists of a single machine 269 (e.g., personal computer) (see FIG. 2A) that has local software 270 stored thereon, where the local software 270 implements the functionality of the components 122, 124, and 126 of SES 120 (discussed below) as well as the functionality of computer program 103.

Computer program 103 is operable to cause client devices 101 to transmit search requests to the SES 120 via network 110. In one embodiment, client devices 101 may transmit the search request in accordance with one or more communication protocols. For instance, in some embodiments, a client device 101 may include a search request in a hypertext transfer protocol (HTTP) message (e.g., an HTTP GET request) and may transmit the search request to SES 120 by transmitting to the SES 120 the HTTP message over network 110.

Figure 2B:
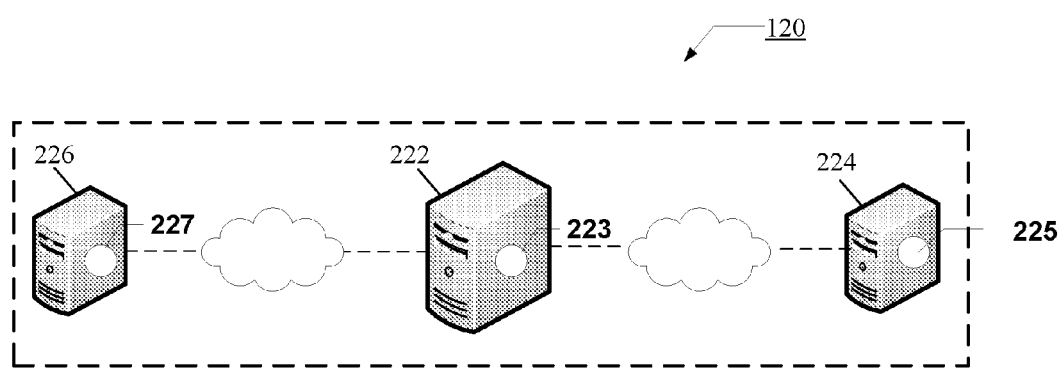

As further illustrated in FIG. 1, in one embodiment, SES 120 includes the following functional components: a query processor (QP) 122, an indexer 124, and a vector generator 126. In some embodiments, SES 120 may be a distributed system. For example, as illustrated in FIG. 2, SES 120 may include a separate specific machine (e.g., a server computer) for each functional component. In the example shown in FIG. 2, SES 120 according to one embodiment includes three machines 222, 224, and 226, where: i) machine 222 performs the query processor functionality by, for example, executing query processor computer code 223 stored on a non-transitory computer readable medium readable by machine 222; ii) machine 224 performs the indexer functionality by, for example, executing indexer computer code 225 stored on a non-transitory computer readable medium readable by machine 224; and iii) machine 226 performs the vector generator functionality by, for example, executing vector generator computer code 227 stored on a non-transitory computer readable medium readable by machine 226. Machines 222, 224 and 226 may be co-located in the same facility or may be located in separate facilities that are geographically separated. In some embodiments, two or more of the functional components of SES 120 may be performed by a single machine. For example, a single machine (e.g., machine 222) may perform the indexer, query processor, and vector generator functionality by, for example, executing query processor computer code 223, indexer computer code 225, and vector generator computer code 227.

Indexer 124 may be configured, for example, to crawl a collection of stored content items 190 (which may be a distributed collection) and create a corresponding set of one or more tags 192 for each crawled content item and a tag index 191. For the sake of simplicity and brevity, we shall assume that the collection of content items 190 consists of a collection of videos. Referring now to FIG. 3, FIG. 3 shows two videos (video 304 and video 306) that are included in collection 190. As further shown, each video is stored in a common directory 302 and each video includes one or more segments (as an example video 304 includes segments S1 and S2; video 306 includes segments S3 and S4). In the example shown, segment S1 includes an image a Lego robot and segment S2 indicates that the video 304 is over by displaying "The End" while music plays.

Indexer 124 may be configured to analyze each segment of each video to create, for each analyzed segment, a set of one or more tags. Such created tags are added to tag set 191. A tag may simply be a word or phrase that represents a feature that indexer 124 found in the segment of the video. For instance, the indexer 124 may be configured to recognize images and text included in a video segment as well as convert the audio of the video segment to text.

Thus, for example, if indexer 124 recognizes an image of a robot in a segment of a video, then indexer 124 may create a tag for this image feature of the segment. The tag may include the word "robot" as well as a type identifier that identifies the type of the feature. In this example, the tag may consist of the following tuple: ["robot",Image]. Likewise, for example, if indexer 124 recognizes that the audio portion of a video segment contains the word "robot" because, for example, a person in the video said "robot," then indexer 124 may create a tag for this audio feature of the segment. The tag may include the word "robot" as well as a type identifier that identifies the type of the feature. In this example, the tag may consist of the following tuple: ["robot",Audio]. Indexer 124 may also create tags from meta-data associated with a video. For example, if the title of the video is "robots from mars" then indexer may create the following tag: ["robots from mars",title meta-data].

Accordingly, after the indexing process, each segment of each video may have an associated set of tags. That is, a set of one or more tags may be linked to a video segment. As illustrated in FIG. 3, tags T1-T3 are linked to segment S1; tags T4-T5 are linked to segment S2, tags T6-T7 are linked to segment S3; and tag T8 is linked to segment S4. In this example, tag T1 indicates that an image of a Legorobot was found in segment S1, tag T2 indicates that the text "I am Lego Robot" is displayed during at least a portion of segment S1, and tag T3 indicates the text of what the robot was saying during segment S1. Similarly, T4 could indicate that the words "The End" are displayed in segment S2 while T5 can provide an indication of the music played during segment S2.

In response to receiving a search request, query processor 122 may access tag set 192 to select and retrieve tags included therein for use in determining videos that match query terms included in the received search request. Query processor 122 may then request vector generator 126 to generate vectors, such a query vector and one or more tag, segment, and/or video vectors based on the query terms included in the search request and the selected tags. Query processor 122, in one embodiment, uses the query vector and the tag/segment/video vectors to determine tags/segments/videos that match the search request. Query processor 122 may determine whether a tag matches the search request by comparing the query vector with the tag vector for the tag. After determining the tag, segments, and/or videos that match the search request, query processor 122 returns to the requesting client a search result (e.g., a web page) having a set of search result hyperlinks where each search result hyperlink identifies tag, segment, video, or collection of videos.

Figure 4:
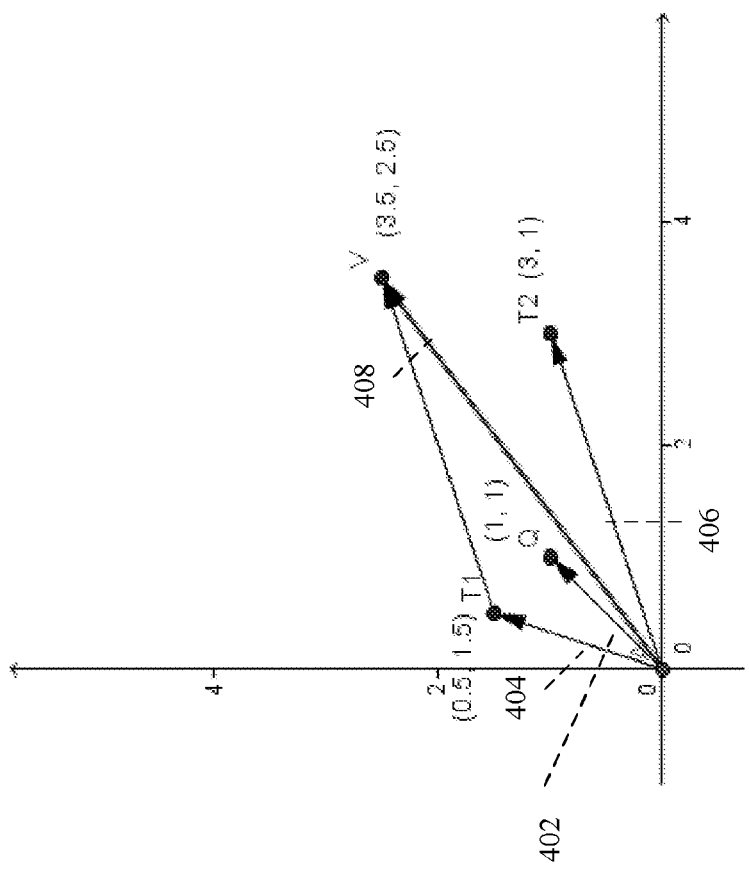
FIG. 4 is an illustration of a vector space in accordance with exemplary embodiments.

Referring now to FIG. 4, FIG. 4 illustrates example vectors that may be generated by vector generator 126 in response to query processor 122 receiving a search request. In this example, the search request includes only two query terms (q1 and q2), thus all the generated vectors lie on the same plane. As illustrated, there is a query vector (VQ) 402, a first tag vector (VT1) 404 corresponding to tag T1, a second tag vector (VT2) 406 corresponding to tag T2, and a video vector (VV) 408 corresponding to video 304.

In one embodiment, VQ=(Wq1,Wq2), where Wq1 is a weight value assigned to the first query term of the search request and Wq2 is a weight value assigned to the second query term of the search request. In the example shown in FIG. 4, Wq1=Wq2=1.

Also, in one embodiment VT1=(Wq1-t1,Wq2-t1), where Wq1-t1 is a weight value which may be a function of the number of timesq1 appears in T1 and Wq2-t1 is a weight value which may be a function of the number of timesq2 appears in T1. Likewise, VT2=(Wq1-t2,Wq2-t2), where Wq1-t2 is a weight value which may be a function of the number of timesq1 appears in T2 and Wq2-t2 is a weight value which may be a function of the number of timesq2 appears in T2. In some embodiments, VT1=fs-t1*(Wq1-t1,Wq2-t1) and VT2=fs-t2*(Wq1-t2,Wq2-t2), where fs-t1 is a feature score for tag T1 and fs-t2 is a feature score for tag T2. The feature score, in some embodiments, is a value assigned to a feature type. For example, as discussed above, a tag may include an identifier that identifies the type of the feature with which the tag is associated. Each such feature type may have a corresponding feature score. For instance, the feature type of "image" may have a feature score of 1.5, whereas the feature score for the feature type of "audio" may have a feature score of 0.3. Thus, using these features scores as an example, if we assume that T1=["robot", Image], then VT1=1.5*(Wq1-t1, Wq2-t1). In some embodiments, as shown in FIG. 4, the video vector VV=VT1+VT2.

Once the query vector and tag vectors are determined (e.g., generated, calculated, or obtained), query processor 122 can compare the query vector with the tag vectors to determine a search score for each tag vector, as discussed more fully below. Similar vector constructions and comparisons may be performed at the segment or video level. As such, in some embodiments, all tags, segments and videos in the corpus can be consistently scored and compared to one another. It is also possible to search for only one type of search result, by only comparing the final search score for tags, segments or videos. This scheme also allows searching for some but not all types of search result (for instance videos and segments, but not tags).

More generically, according to some embodiments, a search request (a.k.a., "query (Q)") can be comprised of a set of query terms q1, q2, . . . qn, and the query can represented by a query vector,VQ, whereVQ=(Wq1, Wq2, . . . , Wqn), and Wqx is the weight for the query term qx in the query Q.

Each tag Tx included in tag set 192 can be represented by a vector, VTx, where, in some embodiments: VTx=fs–tx*(Wq1–tx,Wq2–tx, . . . , Wqn–tx), where Wqn–tx is the weight for the query term qn in tag Tx. In one embodiments, VTx=fs–tx*(Wq1–tx,Wq2–tx, . . . , Wqn–tx), where fs–tx is a feature score for tag Tx.

Each video included in collection 190 can be represented by a video Vector VV, where VV=VT1+VT2+ . . . +VTn, and where VT1 . . . VTn are the tag vectors that represent the tags that are linked to the video. Similarly, each video segment of a video can be represented by a segment vector VS, where VS=VT1+VT2+ . . . +VTm, and where VT1 . . . VTm are the tag vectors that represent the tags that are linked to the segment.

According to some embodiments, query processor 122 determines a search score for a tag, segment or video by determining a cosine similarity value between the query vector generated based on the query and the tag, segment, or video vectors, respectively. This can yield, for instance, a real number between 0 and 1, where a higher score signifies a closer match to the search query. For example, a search score, RTx, for a tag Tx can be determined according to:

$$RTx=(VQ \cdot VTx)/(\|VQ\|\|VTx\|)$$

where (VQ·VTx)/(‖VQ‖ ‖VTx‖) is the cosine similarity between query vector VQ and tag vector VTx. The value of RTx may be some or all of the search score for a tag. Similarly, a score, RSx, for a segment Sxcan be determined according to:

$$RSx=(VQ \cdot VSx)/(\|VQ\|\|VSx\|)$$

where (VQ·VSx)/(‖VQ‖ ‖VSx‖) is the cosine similarity between query vector VQ and segment vector VSx. The value of RSx may be some or all of the search score for a segment. Finally, a score, RV, for a video, V, can be determined according to:

$$RV=(VQ \cdot VV)/(\|VQ\|\|VV\|)$$

where (VQ·VV)/(‖VQ‖ ‖VV‖) is the cosine similarity between query vector VQ and video vector VV. The value of Rv may be some or all of the search score for a video.

Figure 5:
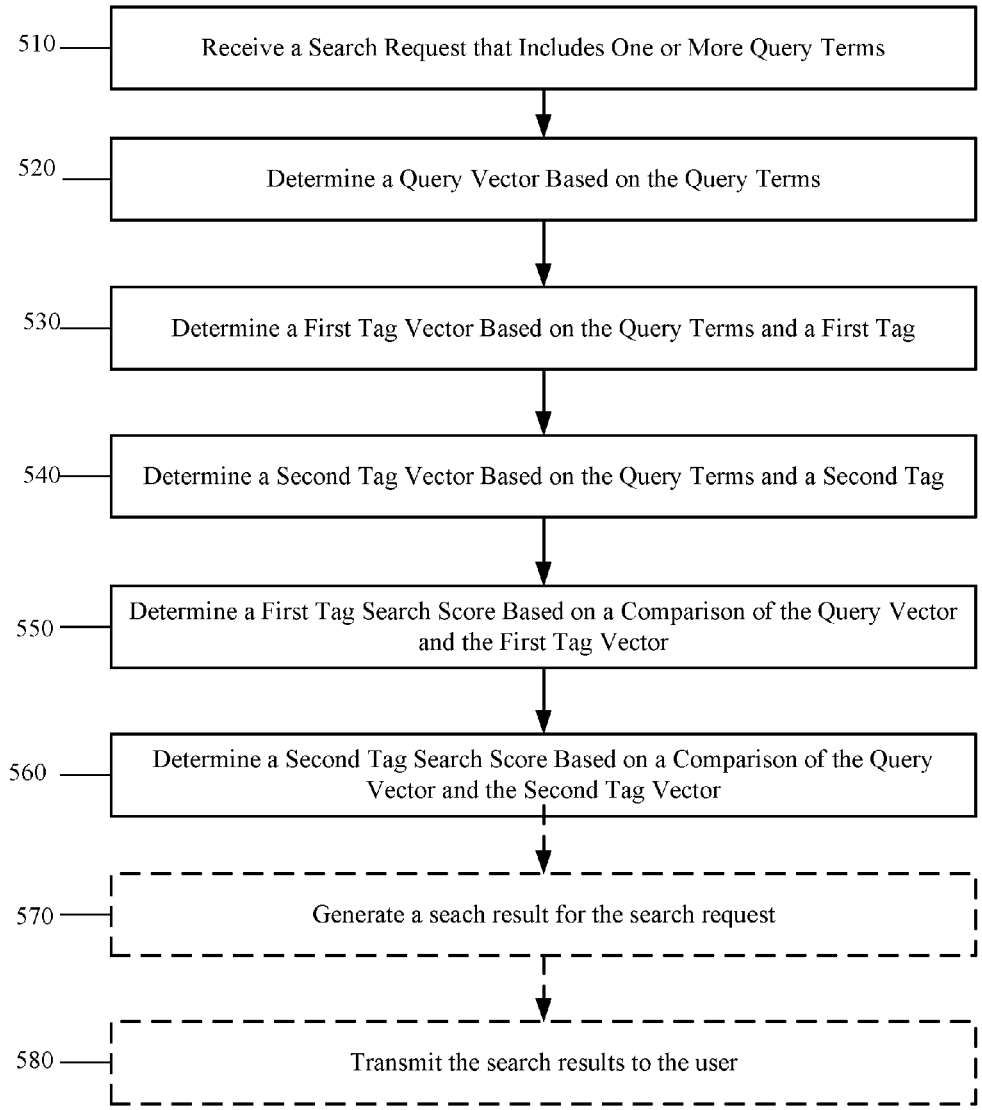
FIG. 5 is a flow chart illustrating a search process in accordance with exemplary embodiments.
Figure 12:
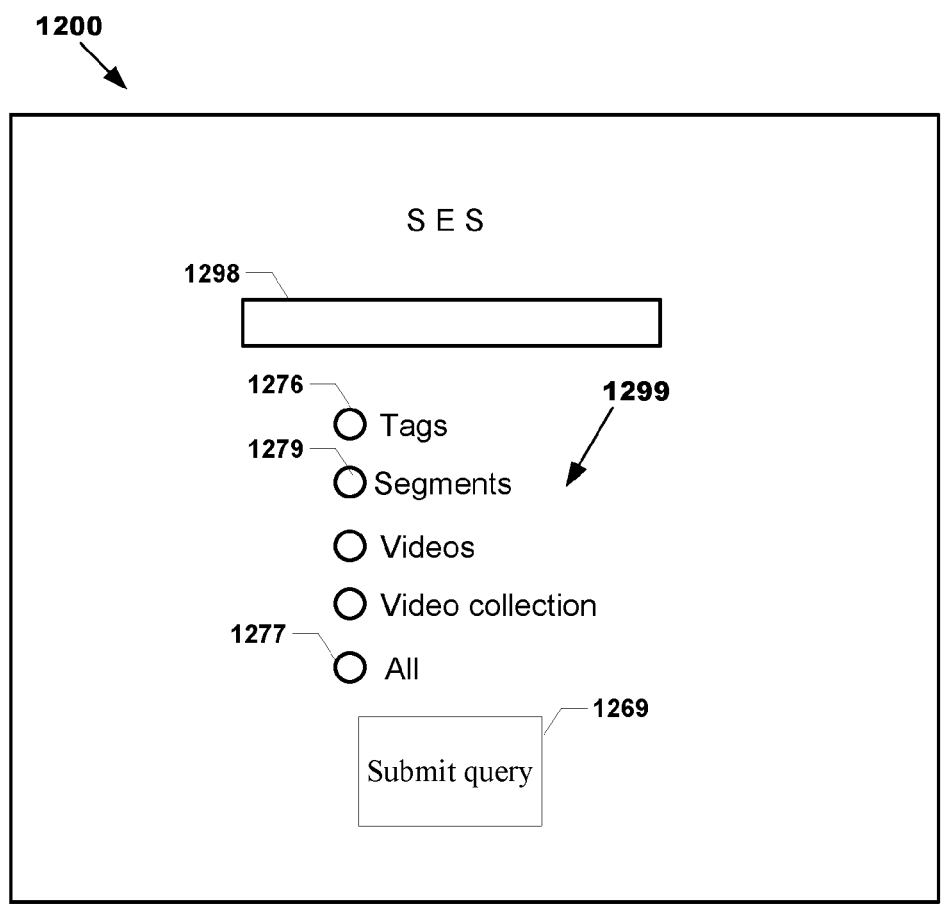
FIG. 12 illustrates an example search form.

Referring now to FIG. 5, FIG. 5 is a flow chart illustrating a process 500, according to an example use case, which process is performed by SES 120. Process 500 may begin with step 510, where SES 120 receives a search request that includes one or more query terms. In this example use case, the SES 120 receives the search request from client device 101a. The search request, in addition to including query terms, may also indicate the type of content items that a user wishes to search. For instance, the search request may include information indicating the user wants SES 120 to search only for videos. In this example use case, the search request indicates that tags may be included in the search result. As an example, the search request may be an text string of the form: "?query_terms=term1,term2,term3&result_type=tags, segments,videos". In some embodiments, computer program 103 generates the search request and causes client device 101 to transmit the generated search request. Computer program 103 may cause the generation of the search request in response to a user clicking a submit button on a search form. FIG. 12 illustrates an example search form 1200 that may be displayed with the help of the computer program 103. As shown, the example search form enables a user to enter into an input field 1298 of form 1200 one or more query terms. Also, form 1200 includes check boxes 1299 that enables the user to specify the result types. When the user clicks on (or otherwise activates submit query button 1269), computer program 103, in response, causes the generation of a search request, such as the one illustrated above, and causes the client 101 on which it is executing to provide the search request to network 110, which will route the search request to SES 120.

In step 520, SES 120 determines a query vector (QV) based on the query terms. As used herein, determining can mean directly determining, calculating, generating, retrieving, receiving, and/or obtaining from either a local or remote source. According to some embodiments, determining the query vector may include utilizing one or more weights associated with each of the query terms. For example, some terms may be considered more important, thereby effecting the size and direction of the query vector. The query vector may be determined as described above. In step 530, SES 120 determines a first tag vector (VT1) based on the query terms and a first tag (T1). In step 540, SES 120 determines a second tag vector (VT2) based on the query terms and a second tag (T2). In step 550, a first tag search score is determined based on a comparison of the query vector and the first tag vector. The comparison may be, for example, a cosine comparison such as discussed above. In step 560, a second tag search score is determined based on a comparison of the query vector and the second tag vector.

In step 570, SES 120 generates a search result for the received search request. The generated search result, in one embodiment, includes a list of items (e.g., tags, segments, videos) that match the search request. For example, the search result may be a mark-up language document (e.g., an XML document, an HTML, document, etc.) that includes a set of hyperlinks where each hyperlink identifies an item that matches the search request. In generating the search result, SES 120 determines whether the first tag should be identified in the search result as matching the search request. This determination is based on the search score for the first tag. For example, in some embodiments, if SES 120 determines that the search score for the first tag exceeds a threshold value, then SES 120 includes the first tag in the search result (e.g., includes in the markup language document a hyperlink that points to the tag). Likewise, SES 120 determines whether the second tag should be included in the search result. Additionally, depending on the parameter of the search request, SES 120 may determine whether to add to the search result a segment, a video, a collection of videos, etc. In step 580, SES 120 transmits the search result to client 101a. In some embodiments steps 570 and 580 are optional.

Figure 6:
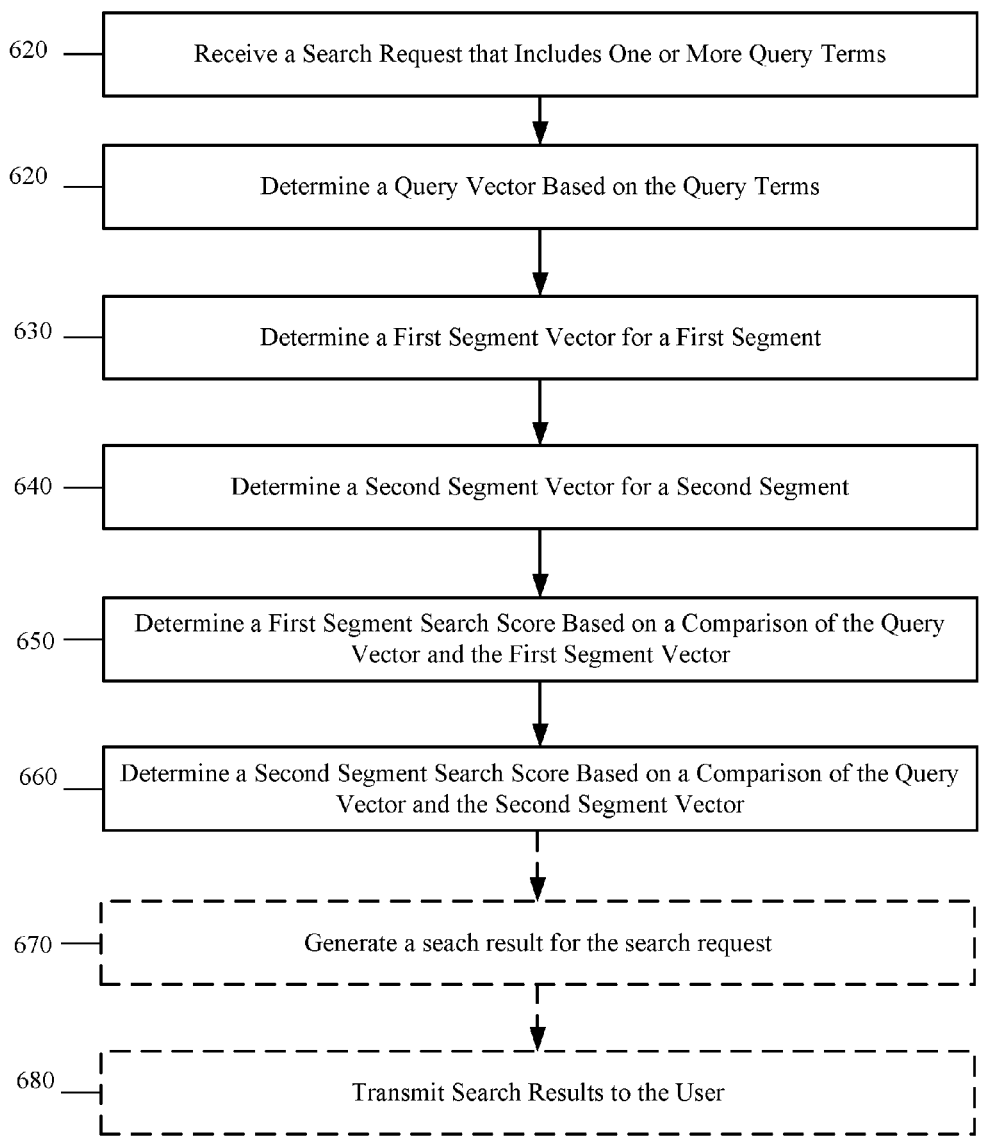
FIG. 6 is a flow chart illustrating a search processing accordance with exemplary embodiments.

Referring now to FIG. 6, FIG. 6 is a flow chart illustrating a process 600, according to another example use case, which process is performed by SES 120. Process 600 may begin with step 610, where SES 120 receives a search request that includes one or more query terms. In this example use case, the SES 120 receives from client device 101a an HTTP message (e.g., GET request) that includes a search request. As discussed above, the search request may indicate the type of content items that a user wishes to search. In this example use case, the search request indicates that segments may be included in the search result.

In step 620, SES 120 determines a query vector (QV) based on the query terms. The query vector may be determined as described above. In step 630, SES 120 determines a first segment vector (VS1) based on the query terms and a first set of tags linked with a first segment of a non-textual content item. In step 640, SES 120 determines a second segment vector (VS2) based on the query terms and a second set of tags linked with a second segment of the non-textual content item. In step 650, a first segment search score is determined based on a comparison of the query vector and the first segment vector. The comparison may be, for example, a cosine comparison such as discussed above. In step 660, a second segment search score is determined based on a comparison of the query vector and the second segment vector.

In step 670, SES 120 generates a search result for the received search request. The generated search result, in one embodiment, includes a list of items (e.g., tags, segments, videos) that match the search request. In generating the search result, SES 120 determines whether the first segment should be identified in the search result as matching the search request. This determination is based on the search score for the first segment. For example, in some embodiments, if SES 120 determines that the search score for the first segment exceeds a threshold value, then SES 120 includes the first segment in the search result (e.g., includes in the markup language document a hyperlink that points to the first segment). Likewise, SES 120 determines whether the second segment should be included in the search result. Additionally, depending on the parameter of the search request, SES 120 may determine whether to add to the search result a tag, a video, a collection of videos, etc. In step 680, SES 120 transmits the search result to client 101*a*.

Figure 7:
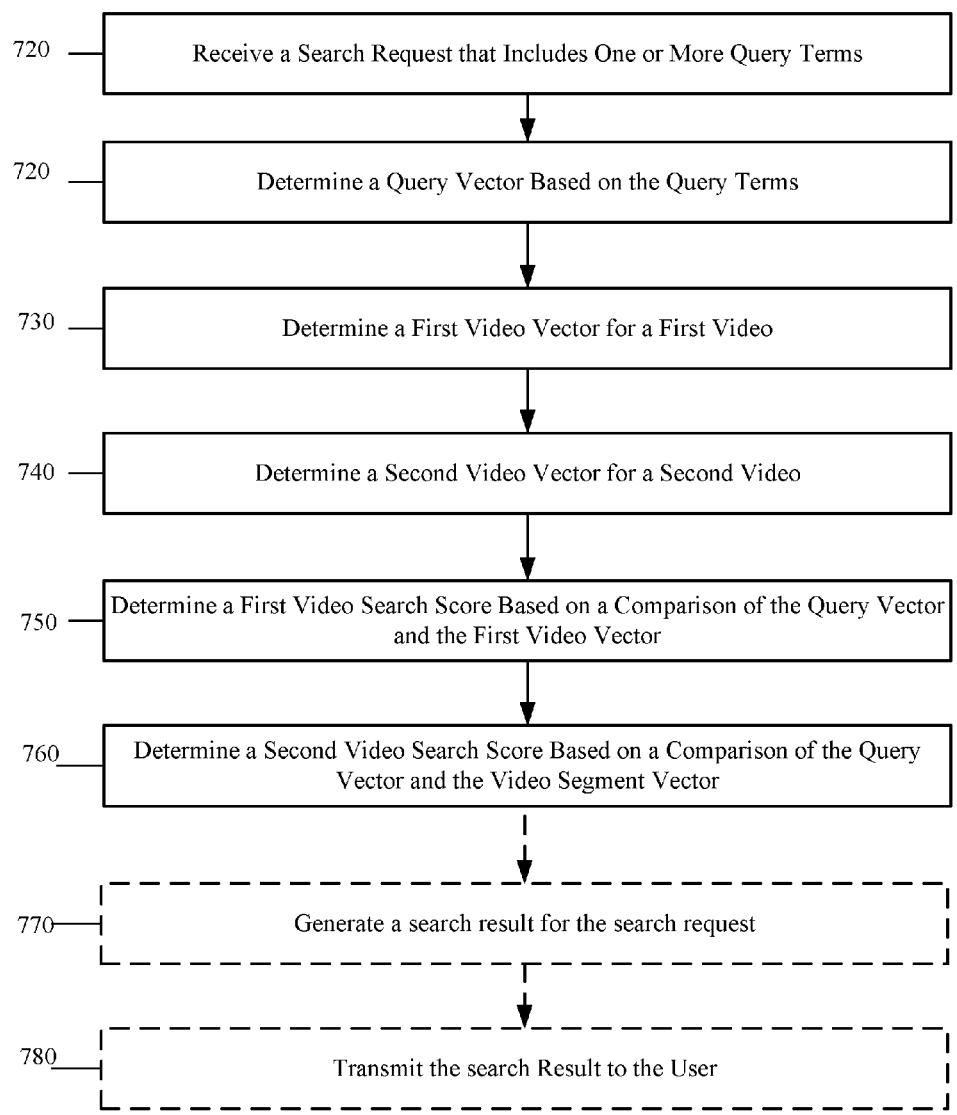
FIG. 7 is a flow chart illustrating a search processing accordance with exemplary embodiments.

Referring now to FIG. 7, FIG. 7 is a flow chart illustrating a process 700, according to another example use case, which process is performed by SES 120. Process 700 may begin with step 710, where SES 120 receives a search request that includes one or more query terms. In this example use case, the SES 120 receives from client device 101*a* an HTTP message (e.g., GET request) that includes a search request. As discussed above, the search request may indicate the type of content items that a user wishes to search. In this example use case, the search request indicates that videos may be included in the search result.

In step 720, SES 120 determines a query vector (QV) based on the query terms. The query vector may be determined as described above. In step 730, SES 120 determines a first video vector (VV1) based on the query terms and a first set of tags linked with a first video. In step 740, SES 120 determines a second video vector (VV2) based on the query terms and a second set of tags linked with a second video. In step 750, a first video search score is determined based on a comparison of the query vector and the first video vector. The comparison may be, for example, a cosine comparison such as discussed above. In step 760, a second video search score is determined based on a comparison of the query vector and the second video vector.

In step 770, SES 120 generates a search result for the received search request. The generated search result, in one embodiment, includes a list of items (e.g., tags, segments, videos) that match the search request. In generating the search result, SES 120 determines whether the first video should be identified in the search result as matching the search request. This determination is based on the search score for the first video. For example, in some embodiments, if SES 120 determines that the search score for the first video exceeds a threshold value, then SES 120 includes the first video in the search result (e.g., includes in the markup language document a hyperlink that points to the first video). Likewise, SES 120 determines whether the second video should be included in the search result. Additionally, depending on the parameter of the search request, SES 120 may determine whether to add to the search result a tag, a segment, a collection of videos, etc. In step 780, SES 120 transmits the search result to client 101*a*.

According to some embodiments, the processes described above may be performed by a searching apparatus. The apparatus may include, for instance, a number of hardware units, each adapted to perform one or more of the above steps. For example, a searching apparatus could include a receiving unit configured to receive, from a client device such as client devices 101*a-c*, a search request that includes one or more query terms. The apparatus may also include one or more determining units configured to determine query, tag, segment, and/or video vectors as described above in connection with processes 500, 600, and 700. The determining units may also be configured to determine a search score and identify one or more media elements to return to the client device. In certain aspects, the results may be transmitted by a transmission unit.

Figure 9:
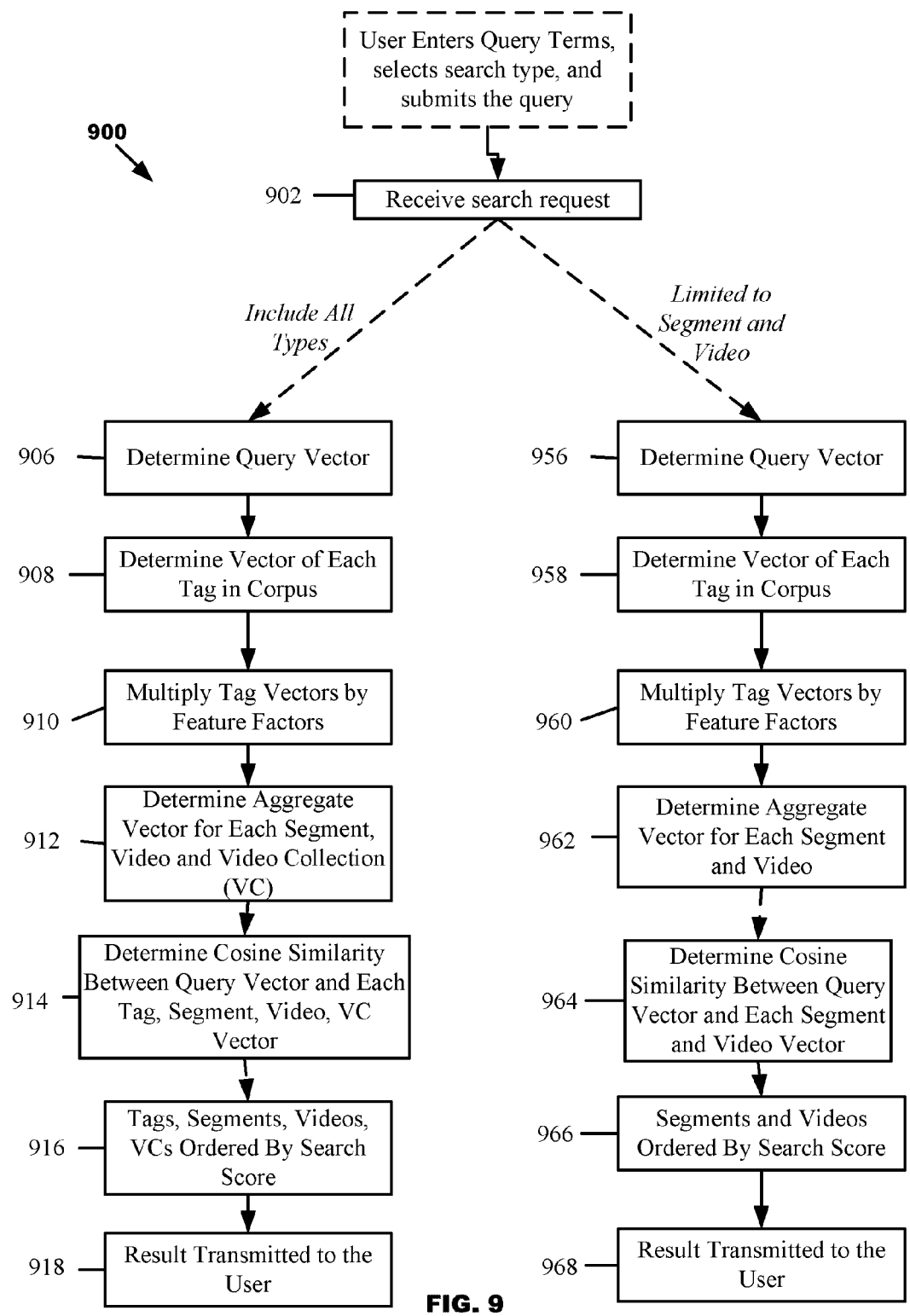
FIG. 9 is a flow chart illustrating a search process in accordance with exemplary embodiments.
Figure 10:
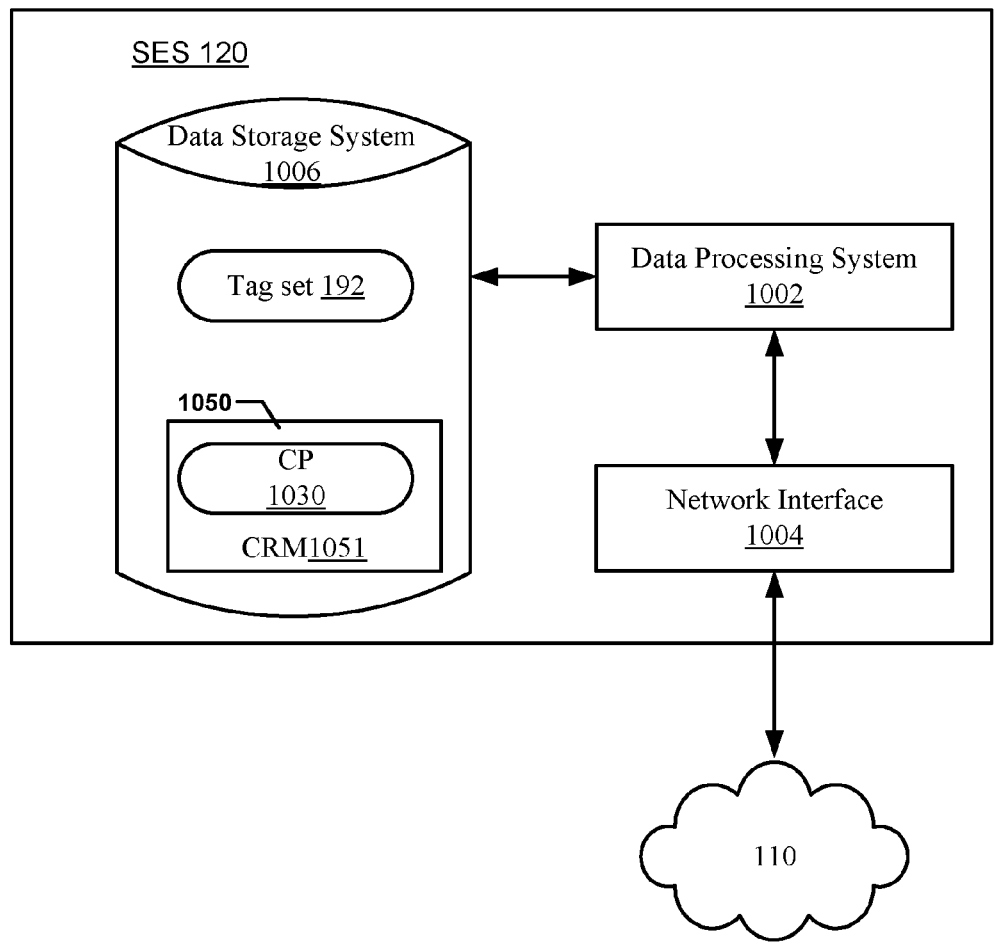
FIG. 10 is a block diagram of a search engine system in accordance with exemplary embodiments.
Figure 11:
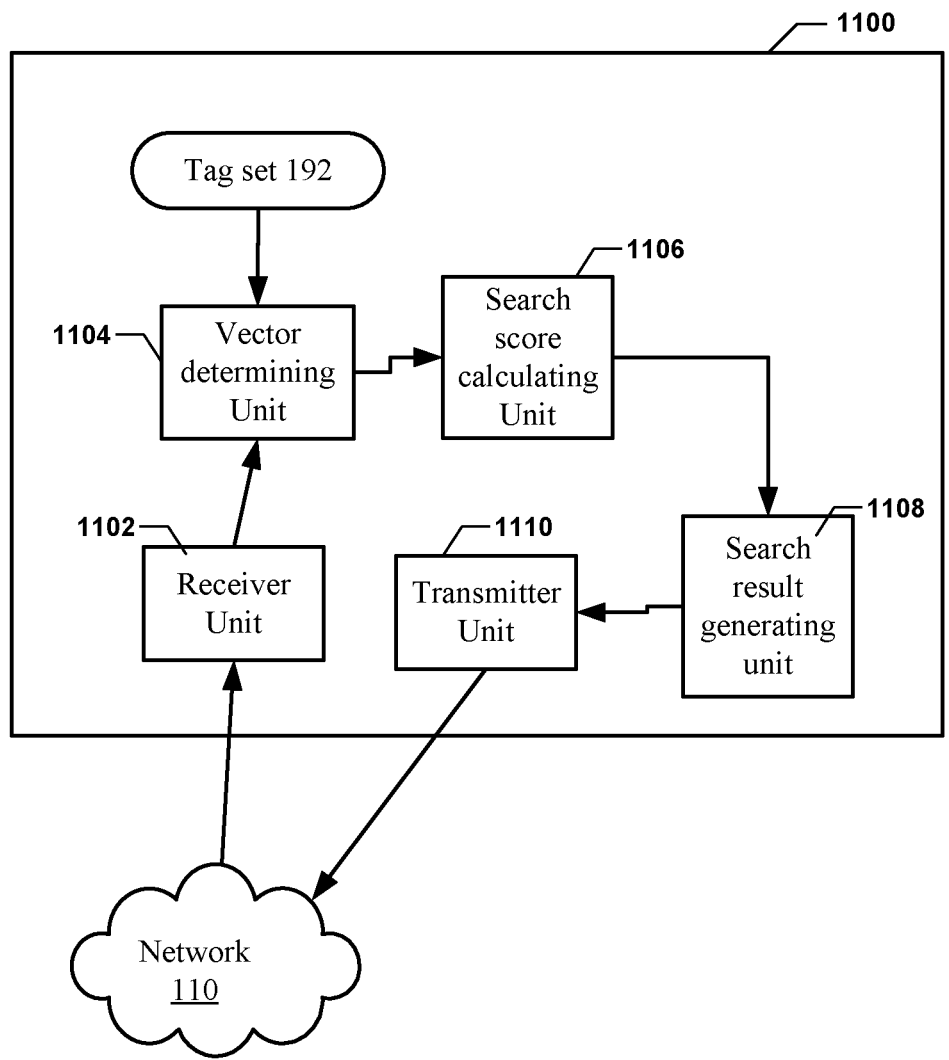
FIG. 11 is a block diagram of a search engine apparatus in accordance with exemplary embodiments.

Referring now to FIG. 8, FIG. 8 illustrates tag set 192 according to some embodiments, which may or may not be used in one of the embodiments previously mentioned in conjunction with FIGS. 1-7, but also FIGS. 9-11. As illustrated, tag set 192 organizes tag, segment, and video information and relationships for SES 120. In the example shown, each video V1-VN is linked with one or more segments. For instance, video V1 is linked with segments S1-S4. Similarly, tag set 192 can provide the relationship between each of the segments and their underlying tags. For instance, the first segment S1 of video V1 is linked with tags T1-TN.

Referring now to FIG. 9, FIG. 9 is a flow chart illustrating a hierarchical search process 900, according to some embodiments, performed by SES 120. As illustrated in FIG. 9, hierarchical search process 900 may be performed in different ways depending on, for instance, a search type selected by a user. For example, a user may select to perform a "tag," a "segment," or a "full" search. For instance, referring to FIG. 12, the user can perform a full search by checking the "All" checkbox 1277. Similarly, a user may select to perform only a tag search by only checking the "Tags" checkbox 1276, and the user may select to perform a tag and segment search by checking checkboxes 1276 and 1279. In short, the user can check one or more of checkboxes 1299. In some embodiments, in the case of a full search, SES 120 performs a search based on all of the available information levels. For instance, in the non-limiting example of process 900, a full search may include determining a search score for tags, segments, videos, and video collections. Alternatively, in the non-limiting example of process 900, the search engine may only determine a search score for segments and videos. In some embodiments, the user may receive different results based on what type of search is selected.

Before the process 900 begins, as a first step, a user formulates a search request by entering query terms into client 101, e.g. via a virtual or physical keyboard displayed on a display of the client 101 or by voice commands. For instance, the user may enter multiple query terms into a text entry box of a webpage displayed by a web browser (see FIG. 12 for an exemplary page). Another example is via an application running on the client 101 and displaying a GUI on a display of the client device. The application can in one such embodiment communicate with SES 120 via HTTP messages or via an API (Application Programming Interface) for the search service provided by SES 120. For illustration, we will assume the user enters the query terms "Lego Robot." In a second step before the process 900, which may also be a portion of the first step, or performed as a separate and independent action, the user determines what type of search he or she would like to perform. After performing the two steps, the user causes client 101 to provide to search engine server system 120 a search request that includes the query terms entered by the user and a search type indicator (e.g., one or more identifiers that identify whether SES 120 should perform a full or limited search).

In step 902 of process 900, which occurs after the user has entered the query terms, selected a search type (optional), and submitted the information, SES 120 receives a search request (or "query") including the entered query terms and search type indicator identifying the user selected search type, and determines, based on the search type indicator included in the search request, the selected search type. If the search type indicator indicates that the user selected to include all types of search results (tags, segments, videos and video collections in this example) (i.e., the user has selected to perform a full search), the process 900 proceeds to step 906.

In step 906, an indication or representation of the user's query is determined, such as a query vector. For instance, the terms "Lego" and "Robot" can each be given a term weight using a weighting technique, such as Tf-idf. In this example, the term "Lego" gets the weight 1 and the term "Robot" gets the weight 1.5. Accordingly, the query vector, VQ, for the user's query is: VQ=(1, 1.5).

In step 908, SES 120 selects a set of tags from tag set 192 and determines a vector for each of the selected tags. The selection of the tags may be done based on identifying tags that include one or more of the search terms, or related terms. For example, in step 908, SES 120 selects from tag set 192 every tag included therein that includes at least one of the query terms included in the user's query. In some embodiments, information regarding the tags may be stored by associating each tag, or tag ID, with keywords. In some embodiments, a vector for every tag in tag set 192 may be generated.

In some embodiments, the search terms "Lego" and "Robot" are given a weight for each tag in the database. This may be done, for example, using the same method that was used to give the weights to the query. If the majority of videos in the database being searched have nothing to do with Legos or robots, and do not contain any tags, segments, or other information relating to Legos or robots, the majority of the tags for both terms will have a weight of 0. The vectors for these tags are (0, 0), and all these tags can safely be excluded from the search.

In the non-limiting example process 900, there are three tags in tag set 192 that have non-zero weights for at least one of the query terms. These tags are T1, T2 and T3. These tags may correspond, for instance, to tags T1, T2 and T3 of the example of FIG. 3. Below are their respective vectors, VT1, VT2, and VT3:

$VT1=(1,0)$ $VT2=(1,1)$ $VT3=(0.5,1)$.

As shown above, in the tag T1, the terms "Lego" and "robot" have the weights 1 and 0 respectively. Similarly, in tag T2, the terms have the weights 1 and 1, while in tag T3, the terms have the weights 0.5 and 1, respectively.

In step 910, each tag's vector is multiplied by its feature factor. A tag's feature factor depends on whether the tag is present in audio, video, on-screen text etc. In the present example, it may be assumed that the tags T1, T2 and T3 have the feature factors 0.5, 1 and 2 respectively:

$X1=0.5$ $X2=1$ $X3=2$

For example, T1 may be an image tag, T2 may be a text tag, while T3 is an audio tag. The size of the feature factor may indicate the relative importance of the feature. For instance, in the present example, audio could be twice as important as text, which is twice as important as image. Each tag's vector is multiplied by its feature factor to yield:

$VT1X1=(1,0)*0.5=(0.5,0)$ $VT2X2=(1,1)*1=(1,1)$ $VT3X3=(0.5,1)*2=(1,2)$

In step 912, an aggregate vector for each segment, video, and video collection (VC) in the corpus is calculated by adding all relevant vectors. For example, it can be assumed that T1, T2 and T3 are all linked to the same video, V, and that T1 and T2 are linked to segment S1, whereas T3 is linked to segment S2. In some embodiments, the vector for a video or segment can be the sum of the tag vectors for the tags that are linked to the video or segment (after multiplication with the tag's feature factor). So, for example, the aggregate video vector VV for the video V can be:

$VV=VT1X1+VT2X2+VT3X3=(0.5,0)+(1,1)+(1,2)=(2.5,3)$.

Similarly, the aggregate segment vectors VS1 and VS2 for segments S1 and S2, respectively, may be the sum of the vectors for all tags present in the segments:

$VS1=VT1X1+VT2X2=(0.5,0)+(1,1)=(1.5,1)$ $VS2=VT3X3=(1,2)$.

Likewise, an aggregate video collection (VC) vector, denoted VVC, is the sum of the video vectors for the videos included in the VC. For instance, if a particular video collection "a", denoted VCa, consists of videos X, Y, and Z, then the aggregate vector for VCa, denoted VVCa, will be: VVx+VVy+VVz, where VVx, VVy, and VVz are the video vectors for videos X, Y, and Z, respectively.

In step 914, the cosine similarity between the query's vector and each tag's, segment's, video's, video collection's vector is calculated to produce a search score for each tag, segment, video and video collection. The procedure for determining the cosine similarity is given above and results in a search score between 0 and 1 for each tag, each segment and each video. Each tag, segment and video can be considered a separate search result that may be returned to a user. For example, the cosine similarity between the video's vector and the query's vector, i.e. the final search score for the video, is calculated below:

$$RV = (VQ \cdot VV)/(\|VQ\|\|VV\|)$$

$$= ((1, 1.5) \cdot (2.5, 3))/\|(1, 1.5)\|\|(2.5, 3)\|$$

-continued $$= (1*2.5 + 1.5*3)/(\sqrt{(12+1.5^2)} * \sqrt{(2.5^2+32)})$$

$$= 7/(\sqrt{(3.25)} * \sqrt{(15.25)})$$

$$\approx 0.994.$$

In step 916, the tags, segments, videos and video collections included in the search are ordered, for instance, by descending search score.

In step 918, the list produced in step 916 is presented to the user as the final search result. The list may be transmitted, for example, as a markup language document, such as an HTML, or XML, document including hypertext transfer protocol links to the content represented in the list.

According to some embodiments, as described above with reference to FIG. 12, the user can also decide if the search result is a list of tags, segments, video, video collections or any combination thereof. For example, a user may choose to search only for videos and segments. If the user selects to only include segments and videos in the search results provided by the process 900, the process proceeds to step 956 where the query's vector is calculated. The process is similar to that described with respect to steps 906-918.

In step 958, the vector of each tag in the corpus is calculated based on the search terms in the query. In step 960, each tag's vector is multiplied by its feature factor. In step 962, an aggregate vector for each segment and video in the corpus is calculated by adding all relevant tags' vectors. In step 964, the cosine similarity between the query's vector and each segment's and video's vector is calculated. This is the final search score. In this example, because of the search type, tags are not included in this step. Similarly, no cosine similarity is calculated between the query and the individual tags, since the user has chosen not to list tags in the search result. In this use case, only the segments and videos will be considered separate search results. In step 966, the segments and videos included in the search are ordered by descending search score. In step 968, the list produced in step 966 is presented to the user as the final search result.

FIG. 10 illustrates an embodiment of SES 120. As shown in FIG. 10, SES 120 may include: a data processing system 1002, which may include one or more general purpose microprocessors and/or one or more circuits, such as an application specific integrated circuit (ASIC), field-programmable gate arrays (FPGAs), and the like; a network interface 1004 configured to enable communication with one or more remote devices via network 110, and a data storage system 1006, which may include one or more non-volatile storage devices and/or one or more volatile storage devices (e.g., random access memory (RAM)). As illustrated, tag set 192 may be stored in data storage system 1006.

In embodiments where data processing system 1002 includes a microprocessor, a computer program product (CPP) 1050 may be provided. CPP 1050 includes a computer readable medium 1051 storing a computer program (CP) 1030 with computer readable instructions/program code. CRM 1051 may be a non-transitory computer readable medium, such as, but not limited to magnetic media (e.g., a hard disk), optical media (e.g., a DVD), memory devices (e.g., random access memory), and the like, where the non-transitory CRM 1051 is a part of the data storage system 1006. In some embodiments, CP 1030 is configured such that when executed by data processing system 1002, the code causes the data processing system 1002 to perform steps described above (e.g., steps described above with reference to the flow chart shown in FIGS. 5-7 and 9). In other embodiments, SES 120 may be configured to perform steps described herein without the need for code. That is, for example, data processing system 1002 may consist merely of one or more ASICs. Hence, the features of the embodiments described herein may be implemented in hardware and/or software. For example, in particular embodiments, the functional components of the search described above may be implemented by data processing system 1010 executing computer instructions, by data processing system 1010 operating independent of any computer instructions, or by any suitable combination of hardware and/or software.

According to some embodiments, the processes described herein may be performed by a search engine apparatus 1100 (see FIG. 11). As illustrated in FIG. 11, the search engine apparatus may include, for instance, a number of hardware units, each adapted to perform one or more of the above steps. For example, search engine apparatus 1100 may include a receiver unit 1102 configured to receive, from a client device 101, a search request that includes one or more query terms. The apparatus 1100 may also include a vector determining unit 1104 configured to determine a query vector as well as tag, segment, and/or video vectors as described above in connection with processes 500, 600, 700, and 900. A search score calculating unit 1106 may be configured to calculate search scores based on comparisons between the tag, segment, and/or video vectors and the query vector, as described herein. For example, tag vectors may be generated for a subset of the tags included in tag set 192 and, for each said tag vector, search score calculating unit 1106 calculates a search score for the tag using as inputs the query vector and the tag vector. A search result generating unit 1108 may use the search scores produced by search score calculating unit 1106 to generate a search result. For instance, as discussed above, a hyperlink corresponding to a particular item (e.g. a particular tag, segment, video, etc.) may be included in the search result if the search score for the item exceeds a threshold. The generated search result (e.g., markup language document) may be provided to a transmitter unit 1110 that is operable to transmit the search result towards the client that submitted the search request.

While various embodiments of the present invention have been described above, it should be understood that they have been presented by way of example only, and not limitation. Thus, the breadth and scope of the present invention should not be limited by any of the above-described exemplary embodiments. Moreover, any combination of the above-described elements in all possible variations thereof is encompassed by the invention unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

The invention claimed is:

1. A method performed by a search engine system (SES), the method comprising:
   receiving, at the SES, a search request transmitted by a client device, wherein said search request includes one or more query terms;
   determining, by the SES, a query vector based on said one or more query terms;
   determining, by the SES, a first set of tag vectors for a first set of tags associated with a first segment of a first non-textual content item;

determining, by the SES, a second set of tag vectors for a second set of tags associated with a second segment of said first non-textual content item;
determining, by the SES, a first segment vector for said first segment by summing said first set of tag vectors;
determining, by the SES, a second segment vector for said second segment by summing said second set of tag vectors;
calculating, by the SES, a first segment search score based on a result of a comparison of said first segment vector to said query vector;
calculating, by the SES, a second segment search score based on a result of a comparison of said second segment vector to said query vector; and
comparing said first segment search score and said second segment search score,
wherein
one or more vectors of the first and second sets of tag vectors is a weighted tag vector,
the weighted tag vector is obtained by multiplying an initial tag vector with a feature score,
the feature score is determined based on a feature type of a tag, and
the feature type is one of image, audio, video, and text.

2. The method of claim 1, further comprising:
determining, by the SES, a first item vector for said first non-textual content item;
determining, by the SES, a second item vector for a second non-textual content item;
determining, by the SES, a first item search score, wherein said first item search score is based on a comparison of said first item vector to said query vector;
determining, by the SES, a second item search score, wherein said second item search score is based on a comparison of said second item vector to said query vector; and
selecting one or more of: said first segment, said second segment, said first non-textual content item, and said second non-textual content item based on said first segment search score, second segment search score, said first item search score, and said second item search score.

3. The method of claim 1, further comprising:
transmitting an ordered set of two or more search results based on the search request, wherein said ordered set of search results includes a first search result that comprises information identifying said first segment, wherein the position of said first search result within said ordered set of search results is determined based on said first segment search score and a search score associated with each search result included in said ordered set of search results.

4. A method performed by a search engine system (SES), the method comprising:
receiving, at the SES, a search request transmitted by a client device, wherein said search request includes one or more query terms;
determining, by the SES, a query vector based on said one or more query terms;
determining, by the SES, a first weighted tag vector based on said one or more query terms and a first tag, wherein said first tag is linked with a first feature located in a first segment of a non-textual content item;
determining, by the SES, a second weighted tag vector based on said one or more query terms and a second tag, wherein said second tag is linked with a second feature located in a second segment of the non-textual content item;
calculating, by the SES, a first tag search score based on a result of a comparison of said first weighted tag vector to said query vector; and
calculating, by the SES, a second tag search score based on a result of a comparison of said second weighted tag vector to said query vector, wherein
said first weighted tag vector is obtained by multiplying a first initial tag vector with a feature score;
the feature score is determined based on a feature type of said first tag, and
the feature type is one of image, audio, video, and text.

5. The method of claim 4, further comprising:
determining, by the SES, an item collection vector for a group of non-textual content items including said non-textual content item.

6. The method of claim 4, wherein said search request includes a search type indicator that indicates a user is requesting, at the least, a tag search.

7. A search engine system (SES) comprising:
a data storage system and a data processing system, said data storage system comprising instructions executable by the data processing system whereby the SES is operative to:
determine a query vector based on query terms included in a search request;
determine a first set of tag vectors for a first set of tags associated with a first segment of a first non-textual content item;
determine a second set of tag vectors for a second set of tags associated with a second segment of said first non-textual content item;
determine a first segment vector for said first segment by summing said first set of tag vectors;
determine a second segment vector for said second segment by summing said second set of tag vectors;
calculate a first segment search score based on a result of a comparison of said first segment vector to said query vector;
calculate a second segment search score based on a result of a comparison of said second segment vector to said query vector; and
compare said first segment search score and said second segment search score, wherein the SES is operative to:
calculate said first segment search score by, at least, calculating: $(VQ \cdot VS1)/(\|VQ\| \|VS1\|)$, where VQ is said query vector, and VS1 is said first segment vector, and
calculate said second segment search score by, at least, calculating: $(VQ \cdot VS2)/(\|VQ\| \|VS2\|)$, where VS2 is said second segment vector.

8. The SES of claim 7, wherein
one or more vectors of the first and second sets of tag vectors is a weighted tag vector,
the weighted tag vector is obtained by multiplying an initial tag vector with a feature score,
the feature score is determined based on a feature type of a tag, and
the feature type is one of image, audio, video, and text.

9. The SES of claim 7, wherein the SES is operative to:
determine a first item vector for said first non-textual content item;
determine a second item vector for a second non-textual content item;

determine a first item search score, wherein said first item search score is based on a comparison of said first item vector to said query vector; and
determine a second item search score, wherein said second item search score is based on a comparison of said second item vector to said query vector.

10. The SES of claim 9, wherein the SES is operative to:
select one or more of: said first segment, said second segment, said first non-textual content item, and said second non-textual content item based on said first segment search score, said second segment search score, said first item search score, and said second item search score.

11. The SES of claim 7, wherein the SES is operative to:
determine an item collection vector for a group of non-textual content items including said first non-textual content item.

12. The SES of claim 7, wherein the SES is operative to:
transmit an ordered set of two or more search results based on the search request, wherein said ordered set of search results includes a first search result that comprises information identifying said first segment, wherein a position of said first search result within said ordered set of search results is determined based on said first segment search score and a search score associated with each search result included in said ordered set of search results.

13. The SES of claim 7, wherein said search request includes a search type indicator that indicates a user is requesting a segment search.

14. A search engine system (SES) comprising:
a data storage system and a data processing system, said data storage system comprising instructions executable by the data processing system whereby the SES is operative to:
determine a query vector based on one or more query terms included in a search request;
determine a first weighted tag vector based on said one or more query terms and a first tag, wherein said first tag is linked with a first feature located in a first segment of a first non-textual content item;
determine a second weighted tag vector based on said one or more query terms and a second tag, wherein said second tag is linked with a second feature located in a second segment of said first non-textual content item;
calculate a first tag search score based on a result of a comparison of said first weighted tag vector to said query vector; and
calculate a second tag search score based on a result of a comparison of said second weighted tag vector to said query vector, wherein
said first weighted tag vector is obtained by multiplying a first initial tag vector with a feature score,
the feature score is determined based on a feature type of said first tag, and
the feature type is one of image, audio, video, and text, wherein
the SES is operative to:
calculate said first tag search score by, at least, calculating: $(VQ \cdot VT1)/(\|VQ\| \|VT1\|)$, where VQ is said query vector, and VT1 is said first weighted tag vector, and
determine said second tag search score by, at least, calculating: $(VQ \cdot VT2)/(\|VQ\| \|VT2\|)$, where VT2 is said second weighted tag vector.

15. The SES of claim 14, wherein the SES is operative to:
determine a first item vector for said first non-textual content item;
determine a second item vector for a second non-textual content item;
determine a first item search score, wherein said first item search score is based on a comparison of said first item vector to said query vector; and
determine a second item search score, wherein said second item search score is based on a comparison of said second item vector to said query vector.

16. The SES of claim 15, wherein the SES is operative to:
select one or more of: said first tag, said second tag, said first non-textual content item, and said second non-textual content item based on said first tag search score, said second tag search score, said first item search score, and said second item search score.

17. The SES of claim 14, wherein the SES is operative to:
determine an item collection vector for a group of non-textual content items including said first non-textual content item.

18. The SES of claim 14, wherein the SES is operative to:
transmit an ordered set of two or more search results based on the search request, wherein said ordered set of search results includes a first search result that comprises information identifying said first tag, wherein a position of said first search result within said ordered set of search results is determined based on said first tag search score and a search score associated with each search result included in said ordered set of search results.

19. The SES of claim 14, wherein said search request includes a search type indicator that indicates a user is requesting a tag search.

20. A computer program product comprising a non-transitory computer readable medium storing computer instructions for searching content, the computer instructions comprising:
instructions for determining a query vector based on query terms included in a search request;
instructions for determining a first set of tag vectors for a first set of tags associated with a first segment of a non-textual content item;
instructions for determining a second set of tag vectors for a second set of tags associated with a second segment of said non-textual content item;
instructions for determining a first segment vector for said first segment by summing said first set of tag vectors;
instructions for determining a second segment vector for said second segment by summing said second set of tag vectors;
instructions for calculating a first segment search score based on a result of a comparison of said first segment vector to said query vector;
instructions for calculating a second segment search score based on a result of a comparison of said second segment vector to said query vector; and
instructions for comparing said first segment search score and said second segment search score, wherein
one or more vectors of the first and second sets of tag vectors is a weighted tag vector,
the weighted tag vector is obtained by multiplying an initial tag vector with a feature score,
the feature score is determined based on a feature type of a tag, and
the feature type is one of image, audio, video, and text.

21. A computer program product comprising a non-transitory computer readable medium storing computer instructions for searching content, the computer instructions comprising:

instructions for determining a query vector based on one or more query terms included in a search request;

instructions for determining a first weighted tag vector based on said one or more query terms and a first tag, wherein said first tag is linked with a first feature located in a first segment of a non-textual content item;

instructions for determining a second weighted tag vector based on said one or more query terms and a second tag, wherein said second tag is linked with a second feature located in a second segment of the non-textual content item;

instructions for calculating a first tag search score based on a result of a comparison of said first weighted tag vector to said query vector; and instructions for calculating a second tag search score based on a result of a comparison of said second weighted tag vector to said query vector, wherein said first weighted tag vector is obtained by multiplying a first initial tag vector with a feature score, the feature score is determined based on a feature type of said first tag, and the feature type is one of image, audio, video, and text.

* * * * *